Aug. 15, 1972     MASAO MATSUI ET AL     3,684,647
NOVEL POLYAMIDE MULTISEGMENTED UNITARY FIBER

Filed March 31, 1970     4 Sheets-Sheet 1

INVENTORS
MASAO MATSUI
MASAHIRO YAMABE
BY Woodhams, Blanchard & Flynn
ATTORNEYS

Aug. 15, 1972    MASAO MATSUI ET AL    3,684,647
NOVEL POLYAMIDE MULTISEGMENTED UNITARY FIBER
Filed March 31, 1970    4 Sheets-Sheet 3

INVENTORS
MASAO MATSUI
MASAHIRO YAMABE

United States Patent Office 3,684,647
Patented Aug. 15, 1972

3,684,647
NOVEL POLYAMIDE MULTISEGMENTED UNITARY FIBER
Masao Matsui and Masahiro Yamabe, Osaka, Japan, assignors to Kanegafuchi Boseki Kabushiki Kaisha, Tokyo, Japan
Filed Mar. 31, 1970, Ser. No. 24,093
Claims priority, application Japan, Apr. 1, 1969, 44/25,066
Int. Cl. D01d 5/28
U.S. Cl. 161—175                    15 Claims

ABSTRACT OF THE DISCLOSURE

A novel polyamide multisegmented unitary fiber having an excellent antistatic property which comprises at least two different polyamides in the form of adherent fine multisegments which are disposed in an intermingled relationship with each other in an arbitrary cross section of the unitary fiber, and which extend substantially continuously along the longitudinal axis of the unitary fiber and occupy at least a part of a periphery of the unitary fiber, one of the polyamides having a chargeable property with positive triboelectricity and the other polyamide having a chargeable property with negative triboelectricity.

---

Figure 1:
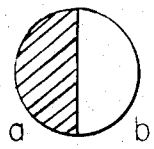

The present invention relates to a novel polyamide multisegmented unitary fiber having an excellent antistatic property and a method for producing the same.

Polyamide fibers which are currently produced on a large scale, for example, nylon-6, nylon-66, etc. have a tendency to be readily charged with electricity generated by friction. They also often cause difficulties in many industrial and apparel uses due to the above tendency. In order to overcome this drawback, several attempts have been made, in typical examples of which a suitable amount of an antistatic agent is mixed with the polyamide raw material or a polyamide is chemically modified so as to improve its electroconductivity.

However, most antistatic agents readily come off the fiber and consequently, lose their effectiveness for preventing the fiber from electrifying, because they are composed of a surface active agent or other water-soluble or hydrophilic compound. Also, in case the polyamide raw material is mixed with any additives, for example, a surface active agent or a modified polyamide such as a copolyamide, the resultant fiber usually has inferior strength and light resistance.

The drawbacks which result from spinning a polyamide with another material such as an antistatic agent are generally due to the facts that the affinity of the polyamide to the other material mixed therewith is poor and that the material which is added to a polyamide for improving its quality usually has a lower molecular weight. From the above standpoint, we carried out research to find a highly polymeric material having a sufficient affinity to a polyamide and having a greater ability for improving the antistatic property of a polyamide. This led us to the discovery of the present invention.

An object of the present invention is to remedy the above drawback, that is, to provide a novel polyamide fiber having an excellent antistatic property. Other objects will be easily understood from the following description.

According to the present invention, we provide a novel polyamide multisegmented unitary fiber having an excellent antistatic property which comprises at least two different polyamides in the form of adherent fine multisegments which are disposed in an intermingled relationship with each other in an arbitrary cross section of the unitary fiber and which extend substantially continuously along the longitudinal axis of the unitary fiber and occupy at least a part of the periphery of the unitary fiber, one of the polyamides having a chargeable property with positive triboelectricity and the other polyamide having a chargeable property with negative triboelectricity.

We also provide a novel polyamide multisegmented unitary fiber having an excellent antistatic property which consists of two adherent components extending throughout the entire length of the unitary fiber and which components are arranged in a side-by-side relationship or in an eccentric or concentric sheath-core relationship, one of the components consisting of an organic thermoplastic linear fiber-forming polymer and the other component consisting of at least two different polyamides in the form of adherent fine multisegments which are disposed in an intermingled relationship with each other in an arbitrary cross section of the unitary fiber and which extend substantially continuously along the longitudinal axis of the unitary fiber and occupy at least a part of the periphery of the unitary fiber, one of the polyamides having a chargeable property with positive triboelectricity and the other polyamide having a chargeable property with negative triboelectricity.

Further, we provide a novel polyamide multisegmented unitary fiber having an excellent antistatic property which consists of two adherent components extending throughout the entire length of said unitary fiber, each of said components consisting of at least two different polyamides in the form of adherent fine multisegments which are like those described above.

The present invention also includes methods for producing a polyamide multisegmented unitary fiber as described above, which comprise layer-multiplying at least two different molten polyamides, one of which has a chargeable property with positive triboelectricity and the other of which has a chargeable property with negative triboelectricity, through joining and dividing steps in different phases into a grainy, nebula-like or archipelagic multisegmented structure and spinning only the layer-multiplied molten polyamides or spinning the layer-multiplied molten polyamides conjugately with a homogeneous molten component consisting of an organic thermoplastic linear fiber-forming polymer or conjugately with another similarly layer-multiplied molten material consisting of at least two polyamides through a spinning orifice.

Now, it is well-known that many conventional polyamides have a chargeable property with positive triboelectricity. However, by our experimental research it was found that some particular polyamides have a chargeable property with negative triboelectricity. The triboelectrically chargeable property of polyamides greatly varies with their raw materials, chemical structures, physical structures such as degree of crystallinity and degree of orientation. Also, the polarity of their triboelectricity was found to vary greatly with contents of amino end group and carboxyl end group, the length of methylene group in a repeated structural unit, etc. It goes without saying that the triboelectricity depends upon the other material to be rubbed with the polyamide, frictional force, temperature, humidity, etc. However, practical and reliable data on triboelectricity are conveniently obtainable by the measuring method referred to hereinafter.

As examples of polyamides which usually exhibit a charging property with positive triboelectricity in case the triboelectricity is measured on the fiber by the method referred to hereinafter, Nylon-4, Nylon-6, Nylon-7, Nylon-66, polymetaxylene adipamide, and copolyamides and modified polyamides predominantly comprising any one of the above polyamides are enumerated.

On the contrary, as examples of polyamides which often exhibit a charging property with negative triboelectricity, polyundecamethylene terephthalamide, polydodecamethylene terephthalamide, polyundecamethylene hexahydroterephthalamide, polydodecamethylene hexahydroterephthalamide, polyparaxylylene dodecanamide, poly(para-bis-cyclohexylene diammonium dodecamethylenedicarbonate), and copolyamides and modified polyamides predominantly comprising any one of the above polyamides are enumerated.

The relation between the polarity of the charge and the chemical structure has not yet been established. But, it is thought that the polyamides which were experimentally found to have a probability of exhibiting a charging property with a negative triboelectricity, usually have the distinctive feature that they have more methylene groups, for example, at least 8, preferably at least 9 methylene groups, between adjacent amide-linkages in their main molecular chain. However, even the polyamide fibers having more methylene groups than the above may exhibit a charging property with positive triboelectricity in some cases which depend upon manufacturing conditions and on the content of an amino end group. Therefore, it is required that the polarity of the charge be confirmed by individually measuring an actual fiber according to the method referred to hereinafter.

When a polyamide having a chargeable property with negative triboelectricity is mixed and spun together with a polyamide having a chargeable property with positive triboelectricity, the negative triboelectricity in the former polyamide may counteract the positive triboelectricity in the latter polyamide. It is, however, difficult to accomplish a satisfactory result, that is, to bring about a better antistatic property only by a uniformly mixed spinning of both kinds of polyamides. As a matter of fact, when a mixed powder or pellet of two kinds of polyamides is fed to a screw extruder where they are melted and homogeneously mixed with each other and spun, the resultant fiber sometimes fails to meet expectations in its antistatic property. Moreover, the resultant fiber usually exhibits a tendency to lower its tensile strength. The above fact is due to a probability of copolymerization caused by an amide exchange reaction between both kinds of polyamides and to the intermingled state itself. In other words, the fiber composed of both kinds of polyamides, which is produced by melting and kneading the powder or pellet of both polyamides and then spinning, has a structure in which one of the components is intermingled with the other in a granular or needle-like structure. The component intermingled in a granular or needle-like structure does not extend continuously along the longitudinal axis of the fiber as shown in FIGS. 15 and 16. As a direct result of the above, the fiber has essentially lower tensile strength, elongation, recovery after elongation, fatigue resistance for repeated elongation and bending. Therefore, a multilayered structure, that is, an adherent fine multisegmented structure in which each segment extends substantially continuously along the longitudinal axis of the fiber as shown in FIG. 14 is preferred.

Thus, the fiber of the present invention has a multilayered structure. Such a fiber having a multilayered structure may also be produced by a conventional conjugated spinning technique.

Figure 2:
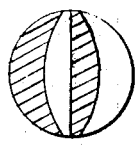
Figure 3:
Figure 4:
Figure 5:
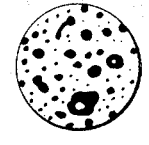
Figure 6:
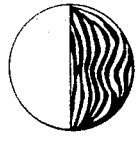
Figure 7:
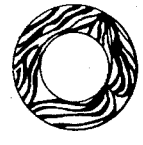
Figure 8:
Figure 9:
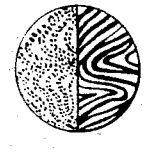
Figure 11:
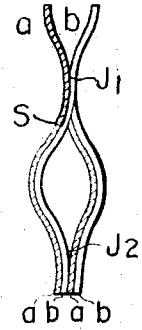
Figure 12:
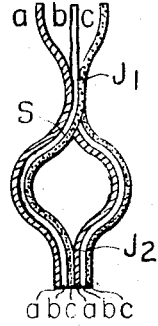
Figure 13:
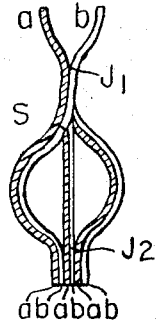
Figure 10:
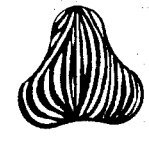
Figure 14:
Figure 15:
Figure 16:
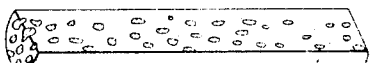
Figure 17:
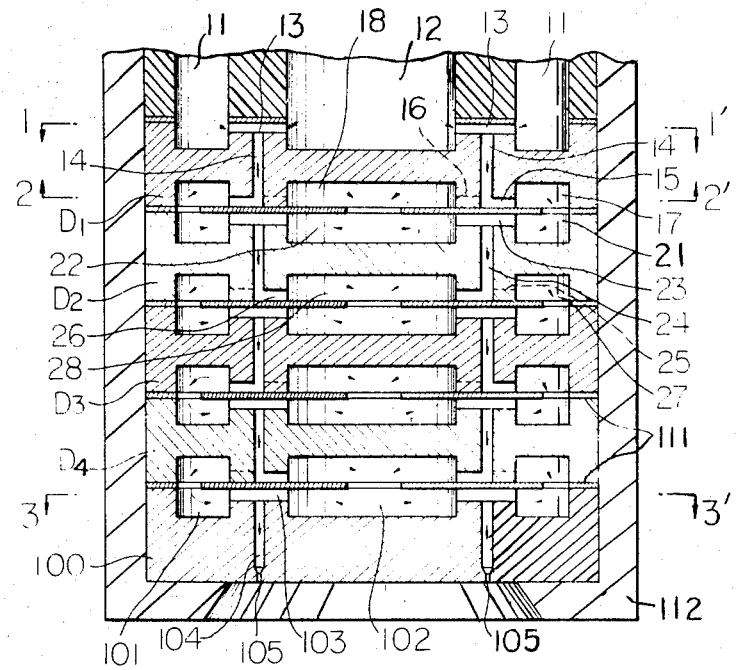
Figure 18:
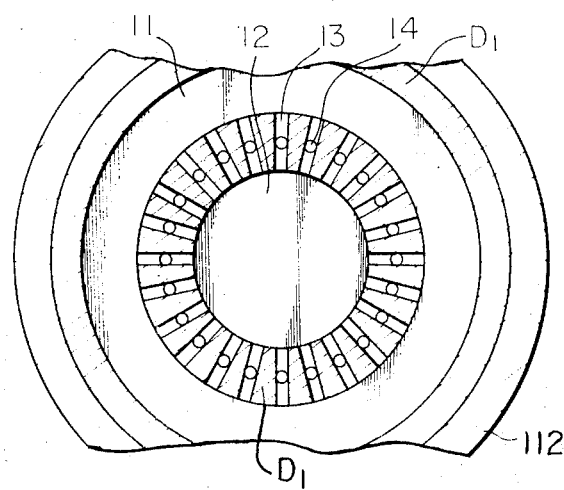
Figure 19:
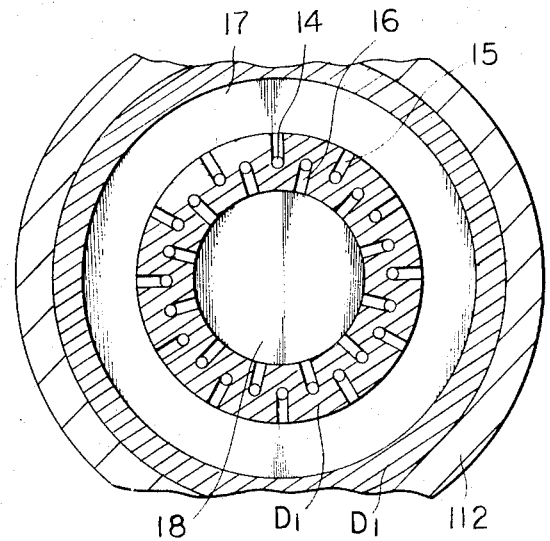
Figure 20:
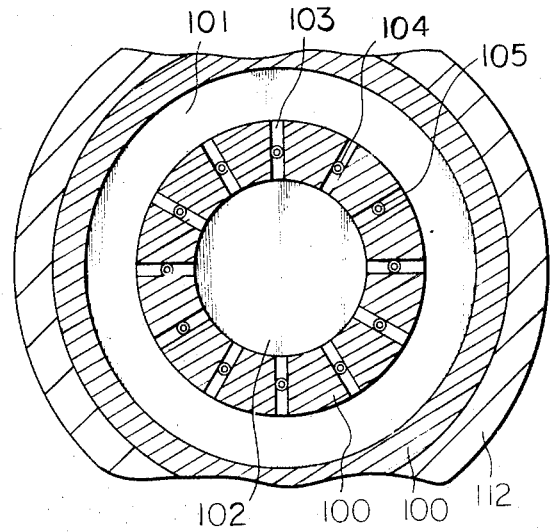

The present invention will be more readily understood by referring to the attached drawings, wherein;

FIG. 1 shows a cross-sectional view of a conventional composite fiber wherein two adherent components are arranged in a side-by-side relationship with each other, FIGS. 2 and 3 show cross-sectional views of fibers each having an adherent multisegmented structure, in which segments are intermingled in a grainy structure, FIGS. 4 and 5 show cross-sectional views of fibers having an adherent multisegmented structure in which fine segments are intermingled in an archipelagic structure and a nebula-like structure, respectively, FIGS. 6, 7 and 8 show cross-sectional views of composite fibers each consisting of two adherent components one of which is an adherent fine multisegmented structure wherein both components are arranged in a side-by-side, a concentric sheath-core and an eccentric sheath-core relationship, respectively, FIG. 9 shows a cross-sectional view of a composite fiber consisting of two adherent components both of which are an adherent fine multisegmented structure and are arranged in a side-by-side relationship, FIG. 10 shows a cross-sectional view of a trilobal fiber having an adherent fine multisegmented structure, FIG. 11 is a model diagram for illustrating a basic method of layer-multiplying two spinning materials into an adherent multisegmented structure, FIGS. 12 and 13 are modifications of a basic method of layer-multiplying as shown in FIG. 11, FIG. 14 shows a perspective view of a longitudinal section of an adherent multisegmented fiber wherein the segments extend substantially continuously along a longitudinal axis of the fiber, FIGS. 15 and 16 show perspective views of a longitudinal section of adherent multisegmented fibers wherein the segments are intermingled in a needle-like and granular structure, respectively, and both segments do not extend substantially continuously along the longitudinal axis of the fiber, FIG. 17 shows a vertical-sectional view of a typical embodiment of the spinneret provided with a layer-multiplying device used for the production of the fiber of the present invention, FIGS. 18, 19 and 20 show cross-sectional views of the spinneret shown in FIG. 17 taken along lines 1—1', 2—2', and 3—3' in the arrow directions, respectively.

Figure 21:
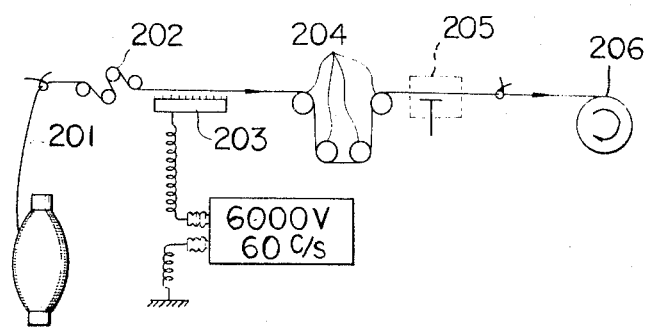
Figure 22:
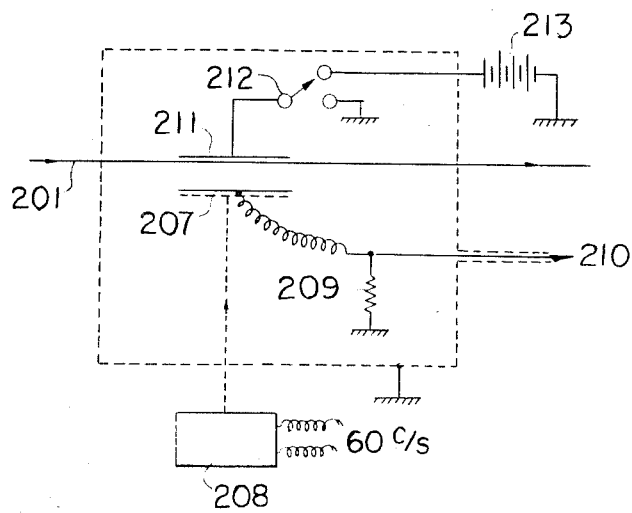

FIG. 21 shows a schematic representation for illustrating the method for measuring a triboelectricity on the fiber, FIG. 22 shows an enlarged schematic representation of a detecting part of the measuring system shown in FIG. 21.

Referring to FIG. 1 showing a cross-sectional view of a conventional two-layered composite fiber wherein two adherent components are arranged in a side-by-side relationship, such a few-layered fiber as the above is not sufficient for achieving the object of the present invention. The structure as shown in FIG. 1 is a so-called "macroscopically" intermingled one, but, even in that structure an electrostatically counteracting effect may be attained to a certain extent. However, in order to secure a satisfactory result, a fiber should have a finer multisegmented structure. A four-segmented fiber, as shown in FIG. 2 exercises a higher counteracting effect than the two-segmented structure as shown in FIG. 1. Fibers having more segmented structures which are shown in FIGS. 3, 4 and 5 as cross-sections, exercise a still higher electrostatically counteracting effect. Therefore, in order to accomplish the object of the present invention, a number of the segments which are seen in a cross-section of the unitary fiber should be four or more, preferably eight or more, more preferably ten or more, and most preferably, twenty-five or more.

The adherent multisegmented structure shown in FIG. 3 is just like a multipled structure of the adherent four-segmented structure shown in FIG. 2. The adherent multisegmented structure as shown in FIGS. 2 and 3 wherein a large number of thin layer segments extending substantially continuously along the longitudinal axis of the unitary fiber are arranged with one another as grainy layers, is referred to as "a grainy multilayer structure."

Another adherent multisegmented structure, as shown in FIG. 4, wherein the most of the segments composed of one component and extending substantially continuously along the longitudinal axis of the unitary fiber have a more or less flat and irregular cross-sectional configuration and are arranged like many islands existing in an ocean in a cross-section of the unitary fiber. This structure is hereinafter referred to as "an archipelagic structure."

A further adherent multisegmented structure as shown in FIG. 5 wherein most of the segments composed of one component and extending substantially continuously along the longitudinal axis of the unitary fiber are substantially circular, oval, or the like in a cross-section of the unitary fiber and are arranged like numerous stars dispersed in a nebula in a cross-section of the unitary fiber. This structure is hereinafter referred to as "a nebula-like structure."

Moreover, the adherent multisegmented structure sometimes has a more complicated structure, for example, some of the island or star-like segments in a cross-section of the unitary fiber consist of two or more components wherein one component conjugates intricately with the other, each component being an island or star-like configuration in the cross-section.

The adherent multi-segmented unitary fiber of the present invention has important features where each of at least two polyamide components composing the multisegments occupies at least the part of a periphery of the unitary fiber, and that the multisegments are disposed in a finely intermingled relationship with each other in an arbitrary cross section of the unitary fiber. In order to counteract the triboelectricity, it is necessary that both the polyamide components are exposed on the peripheral surface of the unitary fiber. In a composite fiber consisting of at least two components wherein one component surrounds the other in a sheath-core relationship, even though the number of the core segments of the component is increased, the electrostatically counteracting effect could not be enhanced in the least.

Furthermore, the multisegmented unitary fiber of the present invention has another feature where the adherent fine multisegments are disposed in an intermingled relationship with each other in a grainy multilayered, archipelagic, or nebula-like structure in at least a part of an arbitrary cross section of the unitary fiber.

Of course, the fine multisegmented structure, as shown in FIGS. 3, 4 and 5 extends substantially continuously along the longitudinal axis of the fiber. To put it more concretely, all the predominant segmented structures have practically a length of several centimeters or more.

From the above explanation, it will be readily understood that though the adherent multisegmented unitary fiber of the present invention has an intermingled structure of at least two different polyamides, it preserves a high dynamic or mechanical property due to its substantially continuous multisegmented structure.

The fiber of the present invention exhibits a slight or no chargeable property with triboelectricity as a result of counteracting the positive triboelectricity of one polyamide component with the negative triboelectricity of the other polyamide component. If the counteracting effect is completely achieved, the resultant fiber has no substantial charging property with triboelectricity. Conventional polyamide fibers having a chargeable property with positive triboelectricity are usually charged at a voltage of from +800 to +1500 volts, when measured by the method hereinafter referred to. On the other hand, polyamide fibers having a chargeable property with negative triboelectricity are usually charged at a voltage of from −500 to −1500 volts.

According to the present invention, the fiber having a charging property to a voltage not exceeding 500 volts, more particularly not exceeding 400 volts, is readily manufactured by intermingling both the positively and negatively chargeable polyamides and forming the adherent multisegmented structure. The fiber having a chargeable property to such a lower voltage, namely not exceeding 500 volts, more particularly not exceeding 400 volts, does not constitute any obstacle in the least in practical use. So, it is not too much to say that the counteracting effect has completely been achieved as to the above fiber.

The electrostatically counteracting effect primarily depends on the weight ratio between the two different polyamides and on the ratio between the surface areas occupied by each of polyamides. Therefore, it is possible to bring about the desired effect by selecting the proper mixing ratio of both polyamides and the mixing means, for example, the type and the capacity of a mixer. The mixing ratio of both polyamides usually employed is from 1:10 to 10:1, preferably from 1:4 to 4:1.

In some cases, it might be possible to counteract triboelectricity to a certain extent by, for example, mix-spinning the two kinds of polyamide fibers each of which has a different polarity of the charge with one another, or doubling, mix-weaving, or mix-knitting the two kinds of yarn each composed of the above polyamide fiber. But, such a macroscopical mixing fails to bring about a desired counteracting effect. In many cases, though the macroscopical mixing of both the components which have a polarity of the electrostatic charge different from each other is effected, the electrifying of the resultant fibrous article is rather enhanced.

On the other hand, in the fiber of the present invention, at least two polyamides which have a polarity of the electrostatic charge different from each other are in the form of adherent fine multisegments, that is, they are microscopically dispersed and intermingled with each other and firmly adhered to each other. Consequently, the fiber of the present invention is decidedly superior in its antistatic effect and its endurance to the above mix-spun article. The fiber of the present invention exhibits an excellent antistatic effect in any form, for example, filament, staple fiber, or any other textile goods such as the article mix-spun, mix-woven, or mix-knitted with other fiber or yarn. The fiber is particularly suitable for many uses such as carpet, underwear, outerwear, and industrial materials, in which an antistatic property is required.

The adherent fine multisegmented unitary fiber of the present invention may be easily produced. The inventors have already proposed spinning apparatus for producing an adherent fine multisegmented unitary fiber, which have a simple structure and are easily constructed and maintained and that an entirely uniform fiber in its structure can be produced with high efficiency by the apparatus, in the copending U.S. patent application Ser. No. 711,070, filed Mar. 16, 1968, now abandoned, and Ser. No. 783,508, filed Dec. 13, 1968, now Pat. No. 3,613,173.

The spinning apparatus comprises a multiplying mixer by which a plurality of spinning materials are layer-multiplied in different phase and a spinneret provided with orifices through which the layer-multiplied molten materials are extruded. The spinning apparatus which the inventors have already proposed in the above U.S. patent applications comprise a layer-multiplying mixer which is roughly divided into two types, one comprising spinning material reservoirs arranged in a multistage arrangement and narrow passages connecting these reservoirs, and the other comprising a three-dimensional network of narrow passages. Both these layer-multiplying mixers can be used for producing the adherent fine multi-segmented unitary fiber of the present invention.

A model diagram for illustrating one basic method of layer-multiplying two spinning materials by using the above layer-multiplying mixers is shown in FIG. 11. In FIG. 11, two spinning materials ($a$ and $b$) are joined at a point $J_1$ to form a two layer structure ($a.b$), which is divided at a point S and then the divided spinning materials are again joined at a point $J_2$ to form a four layer structure ($a.b.a.b.$). Embodiments of the two layer-joined structure ($a.b$) at the point $J_1$ and the four layer-joined structure ($a.b.a.b.$) are like those shown in FIGS. 1 and 2, respectively. When the joining-dividing as shown in FIG. 11 is carried out $n$ times in multi-stages, the number of the resultant adherent layers or segments is calculated to be $2^n$. In order to effectively increase the number of the segments through the joining and the division, the joining should be effected so as to add the number of the segments at least partially, preferably completely and the division should be effected so as to preserve the joined structure at least partially, preferably completely. This purpose can be attained by shifting the direction of the joining at the point J from the direction of the division at the point S, preferably by 90° C. Such a joining and dividing step is referred to as a "joining and dividing step in different phase."

Furthermore, it is needless to say that FIG. 11 shows only one fundamental type of the joining and the division, and there are numerous applications or modifications thereof, that is to say, the fundamental type may be modified or two or more types may be combined. One modification of the fundamental type is shown in FIG. 12. Referring to FIG. 12, three materials (a, b and c) are joined together at a point $J_1$ to form a three layered structure (a.b.c), which is divided at a point S and then the divided structures are again joined at a point $J_2$ to form a six layered structure (a.b.c.a.b.c). Thus, in the above modification, the number of the resultant layers or segments from joining and dividing n times is calculated to be $3 \times 2^{n-1}$. Similarly, in another modification as shown in FIG. 12, in which the joining of two materials and the division into three materials are repeated, the number of the resultant segments is calculated to be $2 \times 3^{n-1}$. Of course, the above-described number of segments is a theoretically calculated value in case the joining and dividing steps are completely effected. In an actual spinning apparatus the flow of the spinning materials is somewhat disturbed and broken up at rare intervals and consequently, the number of segments often deviates from the calculated value.

Through the above joining and dividing steps in different phase, at least two polyamide materials are layer-multiplied into a multisegmented molten structure and then extruded from an orifice to form a grainy, nebula-like or archipelagic multisegmented unitary fiber. A flow of the layer-multiplied molten material may be joined together with a flow of a homogenous molten comoponent consisting of polyamide, polyester, or other organic thermoplastic linear fiber-forming polymer just before it is extruded through an orifice. FIGS. 6, 7 and 8 show cross-sectional views of a composite fiber obtained by the above method. In the schematic representations of the cross sections shown in FIGS. 6, 7 and 8, a component consisting of at least two different polyamides in a form of adherent fine multisegments and a component consisting of an organic thermoplastic linear fiber-forming polymer are arranged in a side-by-side, a concentric sheath-core, and an eccentric sheath-core relationship, respectively. In the composite fiber, the component consisting of at least two different polyamides in the form of adherent fine multisegments should occupy at least a part of a periphery of the composite fiber with a view to achieving the electrostatically counteracting effect.

So, in the composite fibers of the sheath-core type as shown in FIGS. 7 and 8, the component comprising at least two different polyamides surrounds the other component. On the other hand, a composite fiber consisting of two adherent components both of which are adherent fine multisegmented structures and are arranged in a side-by-side relationship as shown in FIG. 9, also counteracts the effect of triboelectricity.

The composite fiber in which the two components are arranged in an eccentric relationship in an arbitrary cross section as shown in FIGS. 6, 8 or 9 has a spontaneous crimping property.

Any conventional orifices, for example, having a non-circular cross section also may be employed. FIG. 10 shows a non-circular cross section of the adherent fine multisegmented unitary fiber extruded from orifices having a Y-shaped cross section. Several examples of the fibers wherein fine multisegments are intermingled in a grainy multilayered structure are shown in FIGS. 6-10, but an archipelagic or a nebula-like structure also may be obtained by means of the above spinning apparatus.

A typical embodiment of the method for producing the fiber of the present invention will be explained with reference to the spinneret provided with a layer multiplying mixer shown in FIGS. 17-20.

FIG. 17 shows a vertical-sectional view of a spinneret provided with a layer-multiplying mixer comprising spinning material reservoirs arranged in a multistage and narrow passages connecting these reservoirs. The spinneret comprises four disk-shaped mixer units $D_1$, $D_2$, $D_3$, $D_4$ which are successively superposed between a spinning material feeding unit having reservoirs (11 and 12) and a spinneret plate 100 having orifices (105). In the spinneret the joining of flows of two molten polyamides is carried out five times ($n=5$). Each mixer unit is provided on the upper surface with two reservoirs 21, 22 and ducts 13, 23 connecting these reservoirs and on the lower surface with two reservoirs 17, 18, 27, 28 and distributing passages 25 and 26. The distributing passages 25, 26 connect the lower openings of the vertical conduits 24 alternately with the two reservoirs 27, 28 at the lower surface of the mixer unit $D_2$. The distributing passages 25, 26 are further connected through the vertical conduits 24 and the ducts 13 to the two reservoirs 21, 22 at the upper surface of the mixer unit $D_2$.

In the spinneret show in FIG. 17, two different molten polyamides are fed into reservoirs 11 and 12 in a predetermined mixing ratio by metering pumps. The two molten materials in the reservoirs 11 and 12 are joined at a middle portion of the duct 13, and a part of the joined molten materials flows into an outer reservoir 17 through vertical conduits 14 and distributing passages 15, and another part of the joined molten materials flows into an inner reservoir 18 through vertical conduits 14 and distributing passages 16. The molten materials in the outer reservoir 17 flow into ducts 23 of the second stage mixer unit $D_2$ through an outer reservoir 21 and the molten materials in the inner reservoir 18 flow into the duct 23 through an inner reservoir 22, and these two molten materials are joined at a middle portion of the ducts 23. Similarly, the joining is repeated in the ducts of the mixer units $D_3$, $D_4$ and in the duct 103 of the spinneret plate 100, and the dividing is also repeated in the reservoirs of the mixer units $D_3$, $D_4$ and in the reservoirs 101, 102 of the spinneret plate 100. Lastly, the molten materials flow through the vertical conduit 104 and then they are extruded from orifices 105. In FIG. 17, an arrow shows a direction of flow of the molten materials. 111 is a partition plate or gasket, and 112 is a holder. In this spinneret, the dividing direction is the same with a direction of ducts arrangement, i.e., a circumferential direction. The joining direction in the ducts is a diametrical direction. Thus, the dividing direction is perpendicular to the joining drection.

Furthermore, it is easy to produce a composite fiber having a side-by-side or sheath-core structure by using a spinneret which has a similar structure to that show in FIG. 17 except that it is provided with an additional passage for a third molten material at a middle part of the spinneret. Namely, a molten material flowing through the vertical conduit 104 in the layer-multiplying mixer and a molten material flowing through the above-described passage may be conjugately extruded by a conventional technique. In the above case, it is necessary that a polymer component having an adherent multisegmented structure i.e., exhibiting a tribolecetrically counteracting effect, occupies at least a part of the periphery of the resultant composite filament. A polyamide, polyester, or any other organic thermoplastic linear fiber-forming polymer may be fed into the above third passage.

FIG. 18 is a cross-sectional view of the spinneret shown in FIG. 17 taken along a line 1–1' in the arrow direction and shows an arrangement of reservoirs 11, 12, ducts 13, and conduits 14. FIG. 19 is a cross-sectional view of the spinneret shown in FIG. 17 taken along a line 2–2' and shows an arrangement of conduits 14, distributing passages 15, 16, and reservoirs 17, 18. FIG. 20 is a cross-sectional view of the same shown in FIG. 17 taken along a line 3–3', and shown an arrangement of orifices 105. The number of orifices 105 may be either the same as the number of conduits 14 or not.

It will be apparent from FIGS. 17–20 that a layer-multiplying mixer having an arbitrary number of stages can be easily constructed by just superposing the mixer unit having a very simple structure.

A multilayered structure of the resultant fiber which can be produced by means of the spinneret shown in FIG. 17, depends upon a combination of the spinning materials and a number of mixer units. The inventors have found that a combination of both polymers having a high affinity to each other, for example, a combination of Nylon-6 and Nylon-66, always produces the grainy multilayered structure irrespective of the number of stages of joining-dividings and that a number of the layers in the grainy structure is nearly equal to a calculated value.

On the other hand, in a combination wherein both polymers, have a less affinity to each other, for example, in a combination of nylon-6 and polyethylene terephthalate, the grainy structure, the archipelagic structure and the nebula-like structure have usually been obtained by 2–3 stages of joining-dividings, 4–7 stages of joining-dividings, and 8 or more stages, particularly 10 or more stages of joining-dividings, respectively.

In some cases as illustrated in the above, a combination of two or more different polyamides always produces the grainy structure. However, the combination sometimes produces the archipelagic or nebula-like structure. A combination of a polyamide having a chargeable property with positive triboelectricity and a polyamide having a chargeable property with negative triboelectricity usually produces the grainy or archipelagic structure in a case where the joining-dividing is effected a few times, and produces the archipelagic or nebula-like structure in a case where the joining-dividing is effected many times.

A method for measuring triboelectricity on the fiber is hereinafter explained with reference to FIG. 21.

Continuous filaments may be used as a test specimen. The triboelectricity varies somewhat with the fineness of the filament. Therefore, a multifilament having a denier of approximately 70 is employed as a standard test specimen. First, oiling agents, surface active agents, etc. are removed from the test specimen by washing. Then, the test specimen is subjected to conditioning in a room at 25° C. and 60% RH for more than 24 hours, that is, until it is in moisture equilibrium in the standard atmosphere.

The filament for testing 201 is forwarded through a tension adjuster 202 and an electric charge remover 203 to four friction members 204 where the filament is rubbed against the four friction members, and successively passes through a detector 205, and finally is wound on a winder 206 at a speed of 100 m./min.

The contacting length of the filament with each friction member is a quarter of the circumference of the friction member. Consequently, the total contacting length is equal to the circumference. The electric charge remover 203 is a corona discharger having a voltage of 6000 volts and an alternating cycle of 60 c./s. The friction member 204 is made of aluminous porcelain and has a surface roughness of approximately 6S. The tension adjuster is adjusted so as to produce a tension of 0.5 g./d. at the detecting part 205.

An enlarged schematic representation of the detecting part 205 is shown in FIG. 22. A detecting electrode 207 which is a metallic plate having a length of 5 cm. and a width of 1 cm., is vibrated at an amplitude of 1 mm. and an alternating cycle of 60 c./s. by means of a vibrator 208. A charge which is produced at the electrode 207 by phenomena through the electrostatic induction gives output voltage at both ends of a resistor 209. The resistor has a high resistance 2MΩ. A.C. signal having a cycle of 60 c./s. which is in proportion to a voltage of the filament 201 produced at both ends of the resistor 209, is amplified by an A.C. amplifier 210 and measured. An electrode 211 is used for calibration. Namely, the filament 201 is removed and then a calibration voltage of an electric source or battery 213 is given to the electrode 211 by a switch 212 and the sensitivity of the detector 205 is calibrated. The calibration electrode 211 made of a metallic wire having a diameter of 0.2 mm. is located in parallel to the filament at an interval of 4 mm. and at approximately the same distance from the detection electrode 207 as the filament. The calibration electrode 211 is normally grounded through the switch 212 while a voltage of the filament is measured. The calibration electrode 211 also may be used for deciding the polarity of the charge on the filament. That is, during the measurement on the filament a positive voltage is given to the electrode 211 and the output voltage of a tester is observed. In the above case, if the voltage of the calibration electrode is added up to the voltage of the filament, the polarity of the charge on the filament is decided to be positive. On the contrary, if the former voltage is subtracted from the latter voltage, the polarity is decided to be negative.

The present invention will be illustrated in more detail according to the following examples:

EXAMPLE 1

Epsilon-caprolactam was heated and polymerized in a conventional manner by using acetic acid as a viscosity stabilizer at a mol ratio of 1/300 and water as a catalyst to form nylon–6 polymer which was then washed with water. The thus obtained polymer had an inherent viscosity of 1.10 in m-cresol at 30° C. (referred to as $P_1$).

A mixture of 90 parts by weight of 1,11-undecamethylenediammonium terephthalate and 10 parts by weight of, epsilon-caprolactam was heated to polycondense using acetic acid as a viscosity stabilizer at a mol ratio of 1/200, for three hours at a temperature of 290° C. in nitrogen gas under an atmospheric pressure and thereafter the pressure was gradually reduced until a pressure of 300 mm. Hg was reached, and under which pressure a further polycondensation reaction was conducted for one hour. A polymer having an intrinsic viscosity of 1.06 (referred to as $P_2$) was obtained.

The polymer $P_1$ was melted at a temperature of 280° C. in a screw extruder, extruded through orifices having a diameter of 0.25 mm. provided on a spinneret plate heated at a temperature of 285° C., and solidified in quenching air to form a filament yarn which was wound on a bobbin at a speed of 600 m./min. after applying an oiling agent. The freshly spun filament yarn thus obtained was drawn to 3.6 times their original length at room temperature to form a drawn yarn of 70 denier of 18 filaments (referred to as $Y_1$). Similarly, drawn yarn of 70 denier of 18 filaments (referred to as $Y_2$) was manufactured from the polymer $P_2$. Each of the two drawn yarns $Y_1$ and $Y_2$ was wound on a perforated metallic bobbin. The bobbin wound with yarn was subjected to an extraction with petroleum ether, washed at 80° C. for one hour with a neutral detergent used for washing clothes, and rinsed with boiling water for 4 hours and then air dried. The triboelectricity was determined with respect to both yarns by the method as described above. The yarn $Y_1$ (nylon-6) had a voltage of +1280 volts and the yarn $Y_2$ had a voltage of −1100 volts.

Furthermore, various experiments on mixed spinning were carried out. First, both pellets of polymer $P_1$ and polymer $P_2$ were mixed with each other and subjected to melt-spinning by using an extruder in the same manner as that in the case of yarn $Y_1$ to form a drawn yarn (referred to as $Y_3$).

Secondly, polymer $P_1$ and polymer $P_2$ were separately melted in two extruders and the thus formed two melts were extruded through a spinneret as shown in FIG. 17. That is, polymers $P_1$ and $P_2$ were fed at a feeding ratio of 1/1 by weight into the reservoir 11 and the reservoir 12, respectively. The spinneret was maintained at a temperature of 285° C. The two molten materials were joined together ($n=1$) and extruded through a spinneret which was the same as shown in FIG. 17 except that the number of the orifices 105 was 18 and the mixer units $D_1$, $D_2$, $D_3$ and $D_4$ were omitted. The resultant composite filament yarn having a conventional side-by-side structure was wound on a tube and then drawn in the same manner as in the case of yarn $Y_1$ to form a drawn yarn (referred to as $Y_4$). Similarly, a drawn yarn having a distorted grainy four-layered structure (referred to as $Y_5$) was obtained by the same method as the above filament $Y_4$ except that the spinneret provided with only one mixer unit ($D_1$) ($n=2$) was employed. Next, four kinds of drawn yarn (referred to as $Y_6$, $Y_7$, $Y_8$ and $Y_9$) were obtained by the same method as the above except that spinnerets provided with two ($n=3$), four ($n=5$), six ($n=7$) and nine ($n=10$) mixer units, respectively, were used. Filaments of those yarns had a grainy 8–12-layered structure in the case of $Y_6$ ($n=3$), a grainy-like archipelagic multisegmented structure having more than 30 segments in the case of $Y_7$ ($n=5$), a nebula-like archipelagic multisegmented structure having more than 100 segments in the case of $Y_8$ ($n=7$), and a nebula-like multisegmented structure having more than 200 segments in the case of $Y_9$ ($n=10$), respectively. The voltage of triboelectricity and the tensile strength at break were measured on the yarn. The result is shown in Table 1.

TABLE 1

| Yarn | Voltage (volts) | Tensile strength at break (g./d.) |
|---|---|---|
| $Y_1$ (Nylon-6) | +1,280 | 5.4 |
| $Y_2$ (copolymer) | −1,100 | 4.4 |
| $Y_3$ (chip-blended) | +460 | 2.9 |
| $Y_4$ ($n=1$) | +600 | 4.9 |
| $Y_5$ ($n=2$) | +480 | 4.6 |
| $Y_6$ ($n=3$) | +210 | 4.7 |
| $Y_7$ ($n=5$) | +330 | 4.9 |
| $Y_8$ ($n=7$) | +180 | 4.5 |
| $Y_9$ ($n=10$) | +210 | 4.8 |

It will be apparent from Table 1 that the yarn $Y_3$ has an excellent antistatic property but a reduced tenacity due to its discontinuous segmented structure and the yarn $Y_4$ has no improved antistatic property. The yarn of the present invention $Y_5 \sim Y_9$ has both an excellent antistatic property and a high tensile strength at break.

EXAMPLE 2

Various experiments on mixed spinning were carried out by using polymers $P_1$ and $P_2$ in Example 1 in the same manner as that in the case of the filament $Y_7$ except that the mixing ratio was varied. The relationship between the mixing ratio and the voltage of triboelectricity on the resultant filament is shown in Table 2.

Table 2

| Mixing ratio ($P_1/P_2$): | Voltage (volts) |
|---|---|
| 10/0 | +1520 |
| 10/1 | +1100 |
| 4/1 | +620 |
| 3/1 | +400 |
| 3/2 | +390 |
| 1/1 | +330 |
| 2/3 | +90 |
| 1/3 | −120 |
| 1/4 | −400 |
| 1/10 | −880 |
| 0/10 | −1140 |

Table 2 shows that the lowest voltage (in an absolute value) does not correspond to the mixing ratio of 1/1. Generally, the lowest voltage varies with the combination of polymers employed and the spinning conditions such as the structure of a spinneret, the number of stages (mixer units) in the spinneret). However, the lowest voltage will be easily found from experiments. A filament having considerably improved antistatic property is often obtained over a broad range of mixing ratios, for example, from 1/3 to 3/1, which is very advantageous in practical production.

In this example, polymer $P_1$ and Nylon-66 having a triboelectrically chargeable property with a voltage of +1450 volts were similarly layer-multiplied ($n=5$) to form filaments having an archipelagic cross-sectional structure. The filaments exhibited lower voltage (in an absolute value) than ±400 volts over a broad range of mixing ratio (Nylon-66/$P_2=2/1 \sim 1/3$ by weight).

Similarly, polymer $P_1$ and poly(dodecamethylene terephthalamide/epsilon-caproamide) (referred to as $P_5$) at a ratio of 90/10 by weight and having an inherent viscosity of 0.81 and a triboelectrically chargeable property with a voltage of −1400 volts were layer-multiplied through a spinneret as shown in FIG. 17 ($n=8$) to form filaments. These filaments exhibited lower voltages than ±400 volts over a broad range of mixing ratios ($P_5/P_1=3/1 \sim 1/2$ by weight).

EXAMPLE 3

A salt obtained from azelaic acid and bis(para-aminocyclohexyl) methane (PACM-9 salt) was polymerized at an elevated temperature to obtain a polymer (referred to as $P_6$) having an inherent viscosity of 0.71 and a triboelectrically chargeable property with a voltage of −1270 volts. Polymer $P_6$ and nylon-66 having a triboelectrically chargeable property with a voltage of +1450 volts were used for producing the filament shown in FIG. 7.

That is, a similar spinneret to that shown in FIG. 17 except that the number of layer-multiplying mixer units was 7 and that a small tube was vertically arranged in a center of the vertical conduit 104. The tube for extruding a core-forming molten material from its lower end was connected to a molten material feeding chamber through a third passage.

Polymer $P_6$ was fed into the feeding chamber 11, and nylon-66 was fed into both the feeding chamber 12 and the above feeding chamber (not shown in FIG. 17). A feeding ratio of the three was 1:1:1. The molten materials were conjugately extruded through orifices having a diameter of 0.25 mm., quenched to form a multifilament yarn which was applied with an oiling agent and successively wound on a bobbin. The spinneret was maintained at a temperature of 310° C. The undrawn filament yarn was drawn to 3.4 times their original length on a draw-pin kept at a temperature of 100° C. to form a drawn yarn of 75 denier of 22 filaments (referred to as $Y_{10}$). $Y_{10}$ had a cross-section as shown in FIG. 7 and a triboelectrically chargeable property with a voltage of +490 volts.

What we claim is:

1. A unitary multicomponent fiber having an excellent antistatic property, said fiber having in at least a part of its cross-section and extending along its length a structure consisting essentially of a plurality of different mutually adhering polyamide components of two different types, which polyamide components are capable of being charged triboelectrically with charges of opposite polarity, said polyamide components existing as a multiplicity of distinct segments in the cross-section of the fiber with each segment consisting essentially of one of said polyamide components and in which the segments of the respective types of polyamide components extend substantially continuously for a substantial distance lengthwise of the fiber and in which each type of polyamide component occupies a part of the external surface of the fiber, said structure having a cross-sectional appearance of (1) multiple islands dispersed in a sea to provide an archipelagic configuration, or (2) multiple stars dispersed in a sky to provide a nebula-like configuration;

one type of said polyamide components having the property of being charged with positive triboelectricity and having not more than 6 methylene groups between adjacent amide linkages in its main molecular chain and being selected from a first group consisting of nylon-4, nylon-6, nylon-7, nylon-66, polymetaxylene adipamide, and copolyamides and modified polyamides predominantly comprising any one of the above polyamides of the first group;

the other type of said polyamide components having the property of being charged with negative triboelectricity and having at least 8 methylene groups between adjacent amide linkages in its main molecular chain and being selected from a second group consisting of polyundecamethylene terephthalamide, polydodecamethylene terephthalamide, polyundecamethylene hexahydroterephthalamide, polydodecamethylene hexahydroterephthalamide, polyparaxylylene dodecanamide, poly (para-bis-cyclohexylmethane diammonium dodecamethylenedicarbonate) and copolyamides and modified polyamides predominantly comprising any one of the above polyamides of the second group;

and the weight ratio of said one polyamide component to said other polyamide component is in the range of from 1:10 to 10:1 parts by weight.

2. A fiber as claimed in claim 1, obtained by melting separately said polyamide components, joining the molten polyamide components by directing same toward each other in the same plane and then directing the joined polyamide components in a direction perpendicular to said plane, dividing the joined polyamide components into segments while maintaining the polyamide components joined together, said joining and dividing being repeated at least two times.

3. A fiber as claimed in claim 1, in which the entirety of the cross-section of the fiber has said structure.

4. A fiber as claimed in claim 1, wherein the number of said segments is 4 or more.

5. A fiber as claimed in claim 1, wherein the number of said segments is 8 or more.

6. A fiber as claimed in claim 1, wherein the number of said segments is 10 or more.

7. A fiber as claimed in claim 1, wherein the number of said segments is 25 or more.

8. A fiber as claimed in claim 1, which can be electrostatically charged with a maximum voltage not exceeding 500 volts.

9. A fiber as claimed in claim 1, which can be electrostatically charged with a maximum voltage not exceeding 400 volts.

10. A fiber as claimed in claim 1, wherein the ratio of said two different polyamides is from 1:4 to 4:1 parts by weight.

11. The fiber as claimed in claim 1, in which one part of the cross-section of the fiber has said structure and the remainder of said fiber adheres to said one part and consists of an organic thermoplastic linear fiber-forming polymer.

12. A fiber as claimed in claim 11, wherein said one part and said remainder are arranged in side-by-side relationship with each other and said organic thermoplastic linear fiber-forming polymer is a polymer having adhesion to said polyamide components constituting said one part.

13. A fiber as claimed in claim 11, wherein said one part surrounds said remainder in an eccentric sheath-core relationship.

14. A fiber as claimed in claim 11, wherein said one part surrounds said remainder in a concentric sheath-core relationship.

15. A fiber as claimed in claim 1, in which one part of the cross-section of the fiber has said structure and the remainder of said fiber adheres to said one part, said remainder consisting of a plurality of said polyamide components and having a structure of an archipelagic or nebula-like configuration different from the structure of said one part.

References Cited

UNITED STATES PATENTS

| | | | |
|---|---|---|---|
| 3,577,308 | 5/1971 | Van Drunen et al. | 161—176 |
| 3,515,703 | 6/1970 | Ueda et al. | 260—78 |
| 3,526,571 | 9/1970 | Ogata | 161—175 |
| 3,511,749 | 5/1970 | Ogata et al. | 161—173 |

FOREIGN PATENTS

| | | |
|---|---|---|
| 1,167,182 | 10/1969 | Great Britain. |
| 1,495,835 | 8/1967 | France. |
| 482,844 | 1/1970 | Switzerland. |

ROBERT F. BURNETT, Primary Examiner

R. O. LINKER, JR., Assistant Examiner

U.S. Cl. X.R.

161—177, 180; 264—171, 177, DIG. 29; 317—2 C